United States Patent [19]

Langdon et al.

[11] 4,077,895

[45] Mar. 7, 1978

[54] GLYCOL ANTIFREEZE MIXTURES

[75] Inventors: William Keith Langdon, Grosse Ile; Daniel Ronan Dutton, Woodhaven, both of Mich.

[73] Assignee: BASF Wyandotte Corporation, Wyandotte, Mich.

[21] Appl. No.: 756,177

[22] Filed: Jan. 3, 1977

[51] Int. Cl.$^2$ .................... B01D 19/04; C09K 5/00
[52] U.S. Cl. .................... 252/76; 252/73; 252/77; 252/79; 252/321; 252/358
[58] Field of Search ................ 252/321, 358, 73, 76, 252/77, 79 R

[56] References Cited

U.S. PATENT DOCUMENTS

| | | | |
|---|---|---|---|
| 2,630,439 | 3/1953 | Gunderson | 252/321 X |
| 2,875,156 | 2/1959 | Johnson | 252/321 |
| 2,948,757 | 8/1960 | Pruitt | 252/321 X |
| 3,078,236 | 2/1963 | Hwa | 252/321 |
| 3,931,029 | 1/1976 | Dutton et al. | 252/76 |

*Primary Examiner*—Harris A. Pitlick
*Attorney, Agent, or Firm*—Robert J. Henry; Bernhard R. Swick; Robert E. Dunn

[57] ABSTRACT

A glycol-based antifreeze formulation containing as a defoaming agent, from 0.001% to about 1.0% by weight of the reaction product of a polyglycerol having from 5 to 30 glycerol units, and a glycidyl ether having the formula

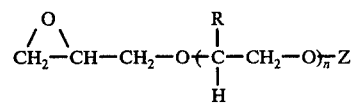

wherein $n$ is an integer from 1 to 20, R is hydrogen, methyl or ethyl, and Z is an alkyl group having from 1 to 8 carbon atoms or the group having the formula

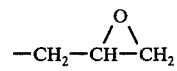

6 Claims, No Drawings

GLYCOL ANTIFREEZE MIXTURES

BACKGROUND OF THE INVENTION

1. Field Of The Invention

The present invention relates to glycol antifreeze mixtures and more particularly to glycol antifreeze mixtures containing an improved defoaming agent.

2. Description Of The Prior Art

Glycol-based antifreeze formulations containing corrosion inhibitors such as borates, silicates, phosphates, caustic, mercaptobenzothiazole, tolyltriazole, nitrates, nitrites and other inhibitors listed in the patent literature do not, by themselves, exhibit excessive foaming tendencies. However, when these glycol-based antifreezes containing the above-mentioned inhibitors are diluted with water for use in internal combustion engine cooling systems, excessive foaming occurs. This foaming causes a loss of coolant from the system and possible subsequent damage to the engine.

It is common practice to include in the glycol-based antifreeze formulations an agent or combination of agents to reduce the foaming of the water-diluted base antifreeze solution. The most commonly used defoaming agents are silicones and polymers of ethylene oxide or propylene oxide or ethylene oxide and propylene oxide copolymers commonly referred to as polyols. The latter type of defoaming agent has been used extensively, and certain modifications thereof have also been used. For example, U.S. Pat. No. 2,923,686 teaches the adduct of propylene oxide and ethylene oxide on glycerol, with each hydroxyl group of the glycerol nucleus being provided with an adduct. These compounds generally have a very low water solubility, but the solubility is sufficient to form a unitary phase in the very low concentrations used.

Certain desirable corrosion inhibitor systems are particularly likely to increase the foaming problem when placed in automobile cooling systems. For example, an excellent corrosion inhibitor is disclosed and claimed in U.S. Pat. No. 3,931,029. In this patent, a polymer is ethylene oxide and propylene oxide is suggested as a defoaming agent.

Antifreeze normally is formulated with 0.03 to 0.05% of defoaming agent. This concentration is necessary to maintain adequate defoaming action for the life of the permanent type antifreeze. A defoaming agent such as the polyol of U.S. Pat. No. 3,931,029 are normally used in the above concentration range. If added to the radiator within a relatively short period of time after it has been formulated, no problem exists, but frequently large scale users, such as the large automobile companies, store the antifreeze in large tanks that contain many thousands of gallons. Upon standing for several days to several months, the defoaming agent rises, forming an upper liquid layer. As a result, when antifreeze is drawn from the base of the tank it is deficient in defoamer and, if the tank is emptied completely, the last portion will be only defoamer, which is completely unsatisfactory as an antifreeze stock. This has been a very serious problem to antifreeze consumers as well as to antifreeze producers.

SUMMARY OF THE INVENTION

It is a primary object of this invention to provide a glycol antifreeze mixture containing a defoamer which (1) is soluble in ethylene glycol based antifreeze formulations, (2) is stable to heat, (3) provides for low foam at a low usage level, and (4) has a cost which is acceptable to the antifreeze industry.

This and other objects are achieved by utilizing in the antifreeze composition, a foam suppressing agent present in an amount of from about 0.001% to about 1.0%, based on the weight of antifreeze, of the reaction product of a polyglycerol having from 5 to 30 glycerol units, and a glycidyl ether having the formula

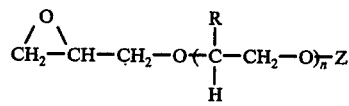

wherein $n$ is an integer from 1 to 20, R is hydrogen, methyl or ethyl, and Z is an alkyl group having from 1 to 8 carbon atoms or the group having the formula

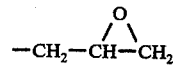

The defoaming of foam suppressing agent of the invention is particularly valuable when used with antifreeze formulations containing the corrosion inhibitor of U.S. Pat. No. 3,931,029, cited above, and insofar as the preparation and use of such inhibitors are pertinent herein, the patent disclosure is hereby incorporated by reference. In general, the inhibitors of the patent are referred to broadly as diacid inhibitors and have the following general formula

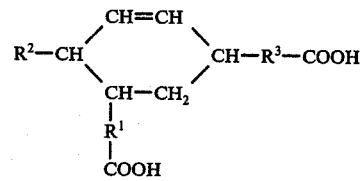

wherein $R^1$ is an alkylene radical containing from 0 to 12 carbon atoms, $R^2$ is an alkyl radical containing from 1 to 10 carbon atoms, and $R^3$ is an alkylene radical containing from 1 to 12 carbon atoms. The inhibitor also includes the mono- and di- metal salts, the mono- and di- ammonium salts, and the mono- and di- amides of the diacid diagrammed above. The preferred diacid inhibitor is 1-carboxy-2-hexyl-5-(7-carboxyheptyl)-cyclohex-3-ene.

DESCRIPTION OF THE PREFERRED EMBODIMENTS

The antifreeze composition is prepared simply by mixing the desired ingredients together in the proportions desired. As the glycol component, commercial ethylene glycol is quite satisfactory. The commercial mixture generally contains at least 85–95% by weight of ethylene glycol and the remainder diethylene glycol and small amounts of other substances which are incidentally present such as water.

The corrosion inhibitors that may be used include any of the usual inhibitor systems known in the art. Preferred is the diacid inhibitor disclosed above, and it is generally used in an amount of 0.01 to 1% by weight, with a typical amount being 0.1%. Other minor additives, some of which aid in inhibiting corrosion are also added such as sodium metaborate, potassium dibasic metaphosphate, sodium mercaptobenzothiazole sodium or potassium hydroxide, sodium nitrate, sodium nitrite, and mineral oil. The selection and combination of these materials is not critical to the present invention, and any of the typical corrosion resistant recipes may be used. However, certain of these additives tend to increase the problem of foaming, and the present invention is particularly valuable in allowing for the use of such systems by its superior foam suppressing capability.

The defoaming agent of the invention is characterized by containing a hydrophilic group in combination with a hydrophobic hydroxypolyoxyalkylene chain. The hydrophilic group is a polyglycerol having from 5 to 30 glycerol units. The polyglycerol containing a desired average number of glycerol units may be prepared in any suitable manner, as is well known to those skilled in the art. One satisfactory procedure, involving dehydration of glycerol in the presence of an alkaline catalyst at 100° to 300° Centigrade is adequately disclosed in Babayan et al. U.S. Pat. No. 3,637,774, the disclosure of which is hereby incorporated by reference.

The hydrophobic group utilized in the invention is attached to the polyglycerol moiety as a hydrophobic hydroxypolyalkylene chain. This group is attached to the polyglycerol by reacting an appropriate oxirane compound with the polyglycerol obtained above.

The oxirane compound utilized herein is a hydrophobic glycidyl ether having the general formula

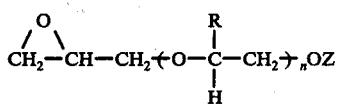

wherein R is hydrogen, methyl or ethyl, n is an integer from 1 to 20, and Z is an alkyl group having from 1 to 8 carbon atoms or the group having the formula

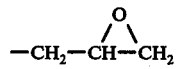

It is convenient to obtain the oxirane-containing hydrophobe material by reacting a hydrophobic alcohol with epichlorohydrin, obtaining a chlorohydrin ether which may, if desired, be reacted with caustic to effect a ring closure and obtain a derived hydrophobic glycidyl ether. In some cases, the chlorohydrin ether itself may be mixed with the polyglycerol and reacted with it under alkaline conditions; when this is done, the oxirane-containing hydrophobe is, in effect, formed in situ and then reacted with the polyglycerol.

One form of the oxirane-containing hydrophobe is derived from a lower alkanol containing 1 to 8 carbon atoms, reacted with several moles of a lower alkylene oxide to form a hydrophobic adduct which is then reacted with epihalohydrin to form a halohydrin or glycidyl ether. In such material a hydrophobic effect is obtained if a ratio of oxygen/carbon atoms less than 0.4 prevails; in other words, although some ethylene oxide may be used, it is essential to use enough propylene oxide or butylene oxide to ensure that the resulting material is hydrophobic. However, the various units may be added either as a heteric-mixture or in sequence. In the preferred area of the invention, the alkylene oxide utilized is propylene oxide.

The other form of the oxirane-containing hydrophobe is derived from a diol obtained by reacting several moles of a lower alkylene oxide with a glycol such as propylene glycol or ethylene glycol to form a hydrophobic adduct which is then reacted with epihalohydrin to form a dihalohydrin or diglycidyl ether. As explained above, hydrophobic effect is obtained if a ratio of oxygen/carbon atoms is less than 0.4. In the preferred area of the invention, propylene oxide is reacted onto a propylene glycol nucleus, and the diglycidyl ether is formed therefrom.

The reaction of the polyglycerol with the glycidyl ether or diglycidyl ether, is catalyzed by basic catalysts. Accordingly, at the conclusion of the formation of the glycidyl ether, it is customary to add to the reaction mixture a sufficient quantity of basic material, such as potassium hydroxide or sodium hydroxide, to neutralize the acid or available acid from organic chlorine that is present and provide a small quantity of basic material to catalyze the final reaction. It is usually not necessary or desirable to remove the salt that is formed by the neutralization of the acid catalyst.

In the final reaction, there is usually used about 0.5 to 1.2 mole of glycidyl ether or diglycidyl ether per mole of the polyglycerol. Preferably, the ratio is about 0.6 to 1.0 moles per mole of the polyglycerol.

The final reaction step is generally conducted under conditions of temperature and pressure that are, on the one hand, sufficient to get a satisfactory rate of reaction and, on the other hand, not so stringent as to cause any appreciable degradation of the product. Ordinarily temperatures such as 80° to 160° and pressures ranging from the atmospheric down to 2 or 3 millimeters of mercury absolute pressure are employed. The reaction time depends principally upon the temperature employed and to some extent upon the scale of the reaction, and it may range from about 20 minutes to several hours.

The oxirane-containing hydrophobe which is reacted with the polyglycerol described above is believed to be capable of reacting readily with any of the hydroxyl groups present anywhere within the structure of the polyglycerol. For example, the polyglycerol will typically have a structural formula as shown below.

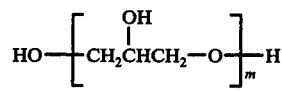

in which m is an integer from 5 to 30 inclusive. Thus the number of available hydroxyl groups will be $m + 2$. For example, if the polyglycerol has ten glycerol units, m is 10, and the number of available hydroxyl groups is 12.

In general, the mole ratio of the glycidyl ether or diglycidyl ether to the polyglycerol will be from 0.5 to 1.2, and the preferred ratio is about 0:6:1 to 1:1. Thus when utilizing a monoglycidyl ether, some of the polyglycerol will not be reacted, and some of the polyglycerol will probably react with more than one glycidyl ether. With the diglycidyl ether, cross-linking and larger molecules are to be expected. However, in the form of the invention now preferred, the reaction mixture is utilized as is.

There is also a certain amount of chlorine substituted in some of the molecules as a side reaction in the preparation of the oxirane compounds. However, only a small percentage of molecules are so substituted and these materials need not be removed.

For example, a typical glycidyl ether reactant has the formula

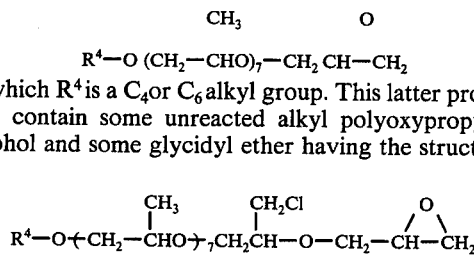

in which $R^4$ is a $C_4$ or $C_6$ alkyl group. This latter product will contain some unreacted alkyl polyoxypropylene alcohol and some glycidyl ether having the structure

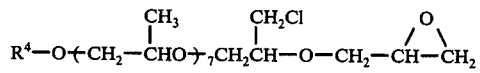

a certain small amount of these materials will also probably be present in the final reaction mixture. At the preferred ratio of polyglycerol:glycidyl ether, the product is highly soluble in water, and is adequately soluble in the antifreeze mixtures. The glycidyl ether by itself (in the hydrated form) was found to be a poor defoamer and polyglycerol by itself has fairly strong foaming action. Therefore, the defoaming properties must result from the combination of the polyglycerol and the glycidyl ether or diglycidyl ether.

The invention described above is illustrated by the following specific examples, in which parts are by weight unless otherwise specified. The examples are to be interpreted as illustrative only, and not in a limiting sense.

EXAMPLE 1

Preparation Of Glycidyl Ethers

Example 1a - Glycidyl Ether Prepared From n-Butanol and 7 Propylene Oxide Units

Potassium hydroxide (90% in flakes) and n-butanol (890 grams) were added to a clean, dry, nitrogen-flushed 2 gallon autoclave to provide a solution of potassium butoxide catalyst in butanol. The autoclave was purged at room temperature with nitrogen and pressurized to 2 atmospheres absolute pressure with nitrogen and heated to 115°. Propylene oxide (4872 grams) were added over a twenty-seven hour period at a maximum pressure of 106 lbs. per square inch gauge while the temperature was maintained at 115°. Stirring was continued for one additional hour at 115° and 100 lbs. per square inch gauge, and the contents were discharged after being cooled to 50°. The weight of the product was 5715 grams. Catalyst was removed from the product by treatment with finely divided synthetic magnesium silicate for one hour at 80°, followed by filtration. Volatiles remaining in the product were then removed by vacuum stripping at 10 millimeters of mercury absolute pressure, while the temperature was raised to 110°. The weight of the product after removal of volatiles was 5000 grams. Analysis indicated the product to have a hydroxyl number of 126.5, which corresponds to a molecular weight of 443. This corresponds to an oxypropylated butanol having approximately 7 oxypropyl groups.

The above-mentioned oxypropylated butanol was then converted to a corresponding hydrophobic glycidyl ether. To a 3-liter flask equipped with a stirrer, thermometer, and addition funnel, there was added 1772 grams (4 moles) of the above-mentioned oxypropylated butanol and 3.5 grams of boron fluoride etherate catalyst. The contents of the flask were warmed to 50°, and 518 (5.6 moles) of epichlorohydrin was added from the addition funnel over a period of two hours at a temperature of 55° to 60° C. Stirring was continued at 55° to 60° C. for one hour. The product was then reacted with caustic soda to form the corresponding glycidyl ether.

This was done by placing 3246 grams of a 40 weight percent aqueous solution of sodium hydroxide in a 5-liter flask and warming the contents of the flask to 20° to 30° C. with stirring. Then, the epichlorohydrin adduct, described above, was added to the caustic soda solution with stirring over a period of 23 minutes. The reaction mixture was heated to 20° to 30° C. and stirred for 30 minutes. It was then diluted with 690 grams of water to dissolve the sodium chloride. The organic layer was separated, stripped of volatiles, treated with synthetic magnesium silicate, and filtered to remove any residual base that may have been present.

Analysis of the product indicated an oxirane oxygen content of 2.80 weight percent, a chlorine content of 4.0 weight percent, and a hydroxyl number of 16.1. The product is thus a glycidyl ether having, as a major component, a compound having a structural formula of

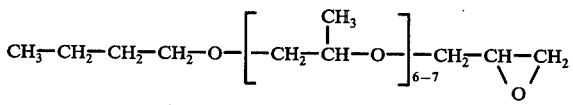

Example 1b - Diglycidyl Ether Prepared From Polypropylene Glycol

The polypropylene glycol used in this example was a proprietary product made by adding propylene oxide to a propylene glycol nucleus. It has a molecular weight of 775, and a viscosity at 100° F of 65 (cps). To a reaction flask equipped with a stirrer, thermometer, and addition funnel, there was added 914 grams of the above described polypropylene glycol and 1.8 grams of boron fluoride etherate catalyst. The contents of the flask were warmed to a temperature of 50° to 65° C. and retained in this range while 232 grams of epichlorohydrin was added from the addition funnel over a period of 55 minutes. Stirring was continued at 50° to 65° C. for a period of 2 hours and 20 minutes to provide 1147 grams of product.

The product was then added to 750 grams of a 40 weight percent aqueous solution of sodium hydroxide in a 3-liter flask which had been warmed to 25° to 30° C. with stirring over a 30 minute period. The mixture was retained at 25° to 30° C. and stirred for an additional 30 minutes. The reaction mixture was then diluted with 600 milliliters water to dissolve the sodium chloride. The organic layer was separated to provide 1090 grams of crude product. The crude product was stripped at 2 millimeters mercury absolute pressure at 72° C. to provide 1045 grams of stripped product. Thereafter the product was treated with synthetic magnesium silicate, and filtered to remove any residual base that may have been present.

Analysis of the product indicated an oxirane oxygen content of 2.87 weight percent, a chlorine content of 2.0 weight percent, and a hydroxyl number of 24. The product is thus a diglycidyl ether having, as a major component, a compound having a structural formula of

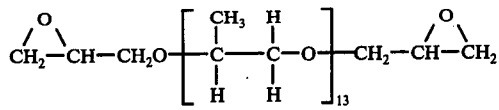

EXAMPLE 2

Preparation of Antifreeze Defoaming Concentrates

Example 2a - Defoaming Concentrate Based On The Combination Of Polyglycerol and A Glycidyl Ether Made From n-Butanol and About 7 Propylene Oxide Units To a 500 milliliter flask blanketed with nitrogen and equipped with a stirrer, addition funnel, thermometer, and vacuum take-off head; there were added 100 grams of a polyglycerol having an average of 15 glycerol units per molecule and 5 grams of a 50 weight percent aqueous solution of sodium hydroxide. Water was removed by distillation at 10 millimeters of mercury absolute pressure and at temperatures of 153° C. Then 50 grams of the glycidyl ether prepared in Example 1a was added dropwise at 150° to 152° C. over a period of one hour. After completion of the addition, the reaction mixture was stirred for one-half hour at 150° to 152° C. The product was a tan paste weighing 151 grams. A 0.1% aqueous solution (by weight) had a surface tension of 30.4 dynes percentimeter and a Draves sink time of 176 seconds.

Example 2b - Defoaming Concentrate Based On The Combination Of Polyglycerol and A Diglycidyl Ether Prepared From Polypropylene Glycol To a 500 milliliter flask blanketed with nitrogen and equipped with a stirrer, addition funnel, thermometer, and vacuum take-off head; there were added 150 grams of a polyglycerol having an average of 12 glycerol unit per molecule, and 5 grams of a 50 weight percent aqueous solution of sodium hydroxide. Water was removed by distillation at 3 millimeters of mercury absolute pressure and at a temperature of 170° C. After cooling to 140° C., the vacuum was released with nitrogen and 150 grams of the diglycidyl ether prepared in Example 1b was added at a temperature of 140° to 160° C. over a period of 15 minutes. After completion of the addition, the reaction mixture was stirred for an additional one and one-half hours at 140 to 160° C. After cooling to 95° C., the product was diluted with 75 grams of water to give 376 grams of 80 percent active product. A 0.1% aqueous solution (by weight) had a clear appearance, a pH of 9.8, a surface tension of 30.8 dynes per centimeter, a Draves sink time of 60.1 second, and a dynamic foam height at 400 milliliters per minute of 90 milliliters at 77° F. with a break time of 0 seconds and 15 milliliters at 120° F. with a break time of 1 second.

Example 2c - Defoaming Concentration Of Prior Art

A prior art concentrate is also used to make an antifreeze for comparison tests. This concentrate consists of a polyoxyethylene adduct of polyoxypropylene having a molecular weight of about 1750 and containing 10 percent by weight of ethylene oxide units.

The Draves sink test is reported in Volume 20, American Dyestuff Reporter, pages 201–208 (1931). The dynamic foam height test is disclosed in an article by H. E. Reich et al. in the April 1961 issue of *Soap and Chemical Specialties*, Volume 37, page 55.

EXAMPLE 3

Preparation Of Antifreeze Compositions According To The Invention

A typical base antifreeze solution was prepared by mixing the following ingredients in the proportions given (said proportions are by weight):

| Component | Percentage |
|---|---|
| Ethylene glycol | 90.61 |
| Diethylene glycol | 4.99 |
| $Na_2B_4O_7 \cdot 5H_2O$ | 1.32 |
| NaOH (50% solution) | 0.74 |
| Sodium Mercaptobenzothiazole (50% solution) | 0.15 |
| Sodium Nitrite | 0.05 |
| Water | 2.04 |
| 1-Carboxy-2-hexyl-5-(7-carboxyheptyl)-cyclohex-3-ene | 0.10 |

Examples 3a through 3c - Antifreeze Compositions Containing Various Defoaming Agents Compositions containing the defoaming concentrates of Examples 2a–2c were prepared by adding said concentrates to the base antifreeze compositions of Example 3 in a weight percent of 0.1 percent. Thus Example 3a contains 0.1 percent of the concentrate of Example 2a (100% active agent), Example 3b contains 0.1 percent of the concentrate of Example 2b and Example 3c contains 0.1 percent of the concentrate of Example 2c.

The antifreeze compositons of Example 3 were tested to determine foaming characteristics according to ASTM D1881 method. In all cases, the solution was 33⅓% antifreeze and the remainder water. The results of the tests are given in the table below.

TABLE

| Antifreeze Solution | Foam Height, ml/ Breaktime, Sec. |
|---|---|
| Base antifreeze of Example 3 | Foamed out of test vessel |
| Example 3a (80% active agent) | 182/7 |
| Example 3a (100% active agent) | 153/10 |
| Example 3b | 63/1.6 |
| Example 3c | 290/10 |

From the Table, it is seen that the defoamers of the invention have excellent foam suppressing capability, and that, in this respect, they are superior to the foam suppressing agents now in use.

From the foregoing description, it is seen that antifreeze compositions may be made using the defoaming agents described herein. In will also be appreciated that these defoaming agents have improved solubility in antifreeze, thereby solving a storage problem heretofore encountered. Moreover, the formulations have such good defoaming properties that they are suitable for use with corrosion inhibitor systems which would otherwise cause excessive foam.

The embodiments of the invention in which a exclusive property is claimed are defined as follows:

1. An antifreeze composition comprising a glycol freezing point depressant, a corrosion inhibitor system, and a foam suppressing agent present in an amount of from about 0.0001% to about 1.0% by weight of the antifreeze composition; said foam suppressing agent comprising the reaction mixture obtained by reacting a polyglycerol having from 5 to 30 glycerol units, and a glycidyl ether having the formula

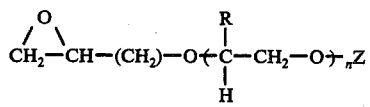

wherein n is an integer from 1 to 20, R is hydrogen, methyl or ethyl, and Z is an alkyl group having from 1 to 8 carbon atoms or the group having the formula

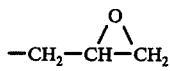

with the mole ratio of the reactants being from 0.5 to 1.2 moles of glycidyl ether or diglycidyl ether per mole of polyglycerol.

2. An antifreeze as defined in claim 1, in which R is methyl.

3. An antifreeze as defined in claim 2, in which n is from 3 to 7.

4. An antifreeze as defined in claim 1, in which the mole ratio of the glycidyl ether or diglycidyl ether to the polyglycerol is from 0.6:1 to 1:1.

5. An antifreeze composition as defined in claim 1, in which the corrosion inhibitor system comprises from 0.01% to 1% by weight of the antifreeze of at least one substance selected from the group consisting of a. compounds corresponding to the structural formula

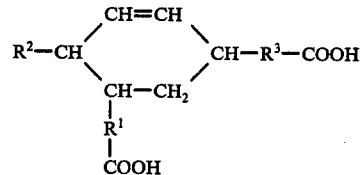

wherein $R^1$ is an alkylene radical containing from 0 to 12 carbon atoms, $R^2$ is an alkyl radical containing from 1 to 10 carbon atoms and $R^3$ is an alkylene radical containing from 1 to 12 carbon atoms, and b. the mono- and di- metal salts, the mono- and di-ammonium salts, and the mono- and diamides of a.

6. An antifreeze composition as defined in claim 5, wherein the inhibitor comprises 1-carboxy-2-hexyl-5-(7-carboxyheptyl)-cyclohex-3-ene.

* * * * *

UNITED STATES PATENT AND TRADEMARK OFFICE
CERTIFICATE OF CORRECTION

PATENT NO. : 4,077,895
DATED : March 7, 1978
INVENTOR(S) : William Keith Langdon and Daniel Ronan Dutton It is certified that error appears in the above-identified patent and that said Letters Patent are hereby corrected as shown below:

Column 8, claim 1, line 66, "0.0001%" should read --0.001%--.

Signed and Sealed this

Twentieth Day of June 1978

[SEAL]

Attest:

RUTH C. MASON
Attesting Officer

DONALD W. BANNER
Commissioner of Patents and Trademarks